(12) United States Patent
Gao et al.

(10) Patent No.: US 11,736,365 B2
(45) Date of Patent: Aug. 22, 2023

(54) SYSTEM AND METHOD FOR NETWORK MANAGEMENT AUTOMATION

(71) Applicant: NETBRAIN TECHNOLOGIES, INC., Burlington, MA (US)

(72) Inventors: Lingping Gao, Lexington, MA (US); Guangdong Liao, Concord, MA (US); Zhekuan Wang, Beijing (CN)

(73) Assignee: NetBrain Technologies, Inc., Burlington, MA (US)

( * ) Notice: Subject to any disclaimer, the term of this patent is extended or adjusted under 35 U.S.C. 154(b) by 0 days.

(21) Appl. No.: 14/956,107

(22) Filed: Dec. 1, 2015

(65) Prior Publication Data

US 2016/0359688 A1 Dec. 8, 2016

Related U.S. Application Data

(60) Provisional application No. 62/171,802, filed on Jun. 5, 2015, provisional application No. 62/171,795, filed
(Continued)

(51) Int. Cl.
*H04L 41/22* (2022.01)
*G06F 3/04817* (2022.01)
(Continued)

(52) U.S. Cl.
CPC .......... *H04L 41/22* (2013.01); *G06F 3/04817* (2013.01); *H04L 41/0886* (2013.01);
(Continued)

(58) Field of Classification Search
CPC ...................................................... H04L 41/22
(Continued)

(56) References Cited

U.S. PATENT DOCUMENTS

| 5,276,789 A | 1/1994 | Besaw et al. |
| 5,504,921 A | 4/1996 | Dev et al. |

(Continued)

FOREIGN PATENT DOCUMENTS

WO    WO 2014/145818 A1    9/2014

OTHER PUBLICATIONS

Extended European Search Report dated Oct. 24, 2016, issued in corresponding European Application No. 16172666.6 (10 pages).
(Continued)

*Primary Examiner* — Suraj M Joshi
*Assistant Examiner* — Sherman Lin
(74) *Attorney, Agent, or Firm* — Crowell & Moring LLP

(57) ABSTRACT

Systems and methods are disclosed for providing visual network programming for network management automation. One exemplary method may include providing a GUI for automating network management tasks and receiving a plurality of graphical icons. Each graphical icon may be associated with one or more operations or functions. The method may also include associating the plurality of graphical icons with a device table for defining a device queue by storing information of at least one network device in the computer network and a device data table for storing information to be retrieved from the at least one network device defined in the device queue. The method may also include generating a network application based on the plurality of graphical icons and associated device table and device data table.

16 Claims, 8 Drawing Sheets

Related U.S. Application Data on Jun. 5, 2015, provisional application No. 62/169,995, filed on Jun. 2, 2015.

(51) Int. Cl.

| | |
|---|---|
| *H04L 41/08* | (2022.01) |
| *H04L 41/02* | (2022.01) |
| *H04L 41/022* | (2022.01) |
| *G06F 8/34* | (2018.01) |

(52) U.S. Cl.
CPC .............. *G06F 8/34* (2013.01); *H04L 41/022* (2013.01); *H04L 41/024* (2013.01)

(58) Field of Classification Search
USPC ......................................................... 709/204
See application file for complete search history.

(56) References Cited

U.S. PATENT DOCUMENTS

| | | | |
|---|---|---|---|
| 5,572,640 | A | 11/1996 | Schettler |
| 5,706,440 | A * | 1/1998 | Compliment ........... H04L 12/44 |
| | | | 370/401 |
| 5,999,179 | A | 12/1999 | Kekic et al. |
| 6,058,103 | A | 5/2000 | Henderson et al. |
| 6,078,924 | A | 6/2000 | Ainsbury et al. |
| 6,137,782 | A | 10/2000 | Sharon et al. |
| 6,151,031 | A | 11/2000 | Atkins et al. |
| 6,205,122 | B1 | 3/2001 | Sharon et al. |
| 6,253,240 | B1 | 6/2001 | Axberg et al. |
| 6,286,035 | B1 | 9/2001 | Gillis |
| 6,289,380 | B1 | 9/2001 | Battat et al. |
| 6,477,572 | B1 | 11/2002 | Elderton et al. |
| 6,628,304 | B2 | 9/2003 | Mitchell et al. |
| 6,678,729 | B1 * | 1/2004 | Ahoor .................... H04L 61/45 |
| | | | 709/227 |
| 6,718,382 | B1 | 4/2004 | Li et al. |
| 6,788,315 | B1 | 9/2004 | Kekic et al. |
| 6,907,572 | B2 | 6/2005 | Little et al. |
| 6,909,708 | B1 | 6/2005 | Krishnaswamy et al. |
| 6,957,263 | B2 | 10/2005 | Galou et al. |
| 7,051,101 | B1 * | 5/2006 | Dubrovsky ........... H04L 41/022 |
| | | | 709/219 |
| 7,054,901 | B2 | 5/2006 | Shafer |
| 7,082,464 | B2 | 7/2006 | Hasan |
| 7,219,339 | B1 | 5/2007 | Goyal et al. |
| 7,254,778 | B2 | 8/2007 | Dikhit |
| 7,310,666 | B2 | 12/2007 | Benfield et al. |
| 7,376,719 | B1 | 5/2008 | Shafer et al. |
| 7,469,139 | B2 | 12/2008 | van de Groenendaal |
| 7,590,718 | B2 | 9/2009 | Gilmour et al. |
| 7,721,304 | B2 | 5/2010 | Datla et al. |
| 7,742,459 | B2 | 6/2010 | Kwan et al. |
| 7,765,320 | B2 | 7/2010 | Vehse et al. |
| 7,783,733 | B1 | 8/2010 | Yip et al. |
| 7,813,281 | B2 | 10/2010 | Bolt et al. |
| 7,823,069 | B1 | 10/2010 | Tanner et al. |
| 7,848,337 | B1 | 12/2010 | Weng et al. |
| 7,908,594 | B2 | 3/2011 | Varanasi et al. |
| 7,996,415 | B1 | 8/2011 | Raffill et al. |
| 8,266,264 | B2 | 9/2012 | Hasan et al. |
| 8,271,626 | B2 | 9/2012 | Childers et al. |
| 8,276,152 | B2 | 9/2012 | Sanghvi |
| 8,386,593 | B1 * | 2/2013 | Gao ........................ H04L 41/22 |
| | | | 709/223 |
| 8,386,937 | B1 | 2/2013 | Gao et al. |
| 8,549,499 | B1 | 10/2013 | Ding et al. |
| 8,782,201 | B2 | 7/2014 | Kephart et al. |
| 8,943,184 | B2 | 1/2015 | Kothe |
| 2002/0054169 | A1 | 5/2002 | Richardson |
| 2002/0152305 | A1 | 10/2002 | Jackson et al. |
| 2002/0161861 | A1 | 10/2002 | Greuel |
| 2002/0198974 | A1 | 12/2002 | Shafer |
| 2003/0009430 | A1 | 1/2003 | Burkey et al. |
| 2003/0033588 | A1 | 2/2003 | Alexander |
| 2003/0051032 | A1 | 3/2003 | Schenkel et al. |
| 2003/0055892 | A1 * | 3/2003 | Huitema ................. H04L 29/06 |
| | | | 709/204 |
| 2003/0101262 | A1 * | 5/2003 | Godwin ................. G06Q 10/06 |
| | | | 709/224 |
| 2003/0135758 | A1 | 7/2003 | Turner |
| 2003/0204590 | A1 | 10/2003 | Torii |
| 2004/0019671 | A1 * | 1/2004 | Metz ..................... H04L 69/329 |
| | | | 709/223 |
| 2004/0024865 | A1 | 2/2004 | Huang et al. |
| 2004/0041833 | A1 | 3/2004 | Dikhit |
| 2004/0194088 | A1 | 9/2004 | Chen et al. |
| 2005/0005266 | A1 | 1/2005 | Datig |
| 2005/0060693 | A1 | 3/2005 | Robison et al. |
| 2005/0138557 | A1 | 6/2005 | Bolder et al. |
| 2005/0165597 | A1 | 7/2005 | Nightingale |
| 2005/0243066 | A1 | 11/2005 | Li |
| 2005/0256961 | A1 | 11/2005 | Alon et al. |
| 2006/0004745 | A1 | 1/2006 | Kuhn et al. |
| 2006/0015591 | A1 | 1/2006 | Datla et al. |
| 2006/0031446 | A1 | 2/2006 | Hamedi |
| 2006/0036612 | A1 | 2/2006 | Harrop et al. |
| 2006/0062154 | A1 * | 3/2006 | Choy ....................... H04L 41/06 |
| | | | 370/242 |
| 2006/0258348 | A1 | 11/2006 | Rajala |
| 2006/0282453 | A1 | 12/2006 | Tjong et al. |
| 2007/0006179 | A1 | 1/2007 | Tjong et al. |
| 2007/0011348 | A1 | 1/2007 | Bansal |
| 2007/0058570 | A1 | 3/2007 | Singh et al. |
| 2007/0101273 | A1 | 5/2007 | Lin et al. |
| 2007/0130112 | A1 | 6/2007 | Lin |
| 2007/0169008 | A1 | 7/2007 | Varanasi et al. |
| 2007/0204231 | A1 | 8/2007 | Cunningham |
| 2007/0283328 | A1 | 12/2007 | Javed et al. |
| 2008/0120129 | A1 | 5/2008 | Seubert et al. |
| 2008/0155423 | A1 | 6/2008 | Moran et al. |
| 2008/0155643 | A1 | 6/2008 | Moran et al. |
| 2008/0165775 | A1 * | 7/2008 | Das ........................ H04L 47/36 |
| | | | 370/392 |
| 2009/0003232 | A1 * | 1/2009 | Vaswani ................. H04L 45/00 |
| | | | 370/252 |
| 2009/0094521 | A1 | 4/2009 | Hung et al. |
| 2009/0119280 | A1 * | 5/2009 | Waters ................... G06F 16/951 |
| 2009/0216867 | A1 | 8/2009 | Pusateri et al. |
| 2009/0288065 | A1 | 11/2009 | Nathan et al. |
| 2010/0023867 | A1 | 1/2010 | Coldiron et al. |
| 2010/0030984 | A1 | 2/2010 | Erickson et al. |
| 2010/0118710 | A1 * | 5/2010 | Ogawa ................. H04L 41/0677 |
| | | | 370/242 |
| 2010/0122175 | A1 | 5/2010 | Gupta et al. |
| 2010/0260066 | A1 | 10/2010 | August et al. |
| 2011/0087988 | A1 | 4/2011 | Ray et al. |
| 2011/0161730 | A1 | 6/2011 | Van Der Merwe et al. |
| 2012/0054551 | A1 | 3/2012 | Gao et al. |
| 2012/0173691 | A1 | 7/2012 | Kothe et al. |
| 2012/0213117 | A1 * | 8/2012 | Banerjee ............... H04L 45/026 |
| | | | 370/254 |
| 2012/0259762 | A1 | 10/2012 | Tarighat et al. |
| 2013/0042222 | A1 | 2/2013 | Maddela |
| 2013/0067018 | A1 | 3/2013 | Reynolds et al. |
| 2013/0073486 | A1 | 3/2013 | Petrick |
| 2013/0198237 | A1 * | 8/2013 | Serban ............... G06F 16/24534 |
| | | | 707/792 |
| 2013/0290224 | A1 | 10/2013 | Crowns et al. |
| 2013/0305091 | A1 | 11/2013 | Stan et al. |
| 2014/0004071 | A1 | 2/2014 | Smith |
| 2014/0078930 | A1 | 3/2014 | Bevemyr |
| 2014/0207840 | A1 | 7/2014 | Smith et al. |
| 2014/0258985 | A1 | 9/2014 | Yawn et al. |
| 2014/0280831 | A1 | 9/2014 | Gao et al. |
| 2014/0280833 | A1 | 9/2014 | Gao |
| 2014/0282027 | A1 | 9/2014 | Gao et al. |

OTHER PUBLICATIONS

United States Patent and Office Action, dated Mar. 20, 2012, U.S. Appl. No. 12/510,467, 13 pages.

(56) References Cited

OTHER PUBLICATIONS

Cisco Systems, Inc. "Show Command Section Filter," Cisco IOS Release 12.3(2)T, 6 pages, 2003.
Office Action, dated Apr. 2, 2012, U.S. Appl. No. 12/505,432, 24 pages.
NetBrain Workstation Architect Edition, parts of chapter 10, 04/272010.
NetBrain wORKSTATION 2.0 Oct. 10, 2008.
NetBrain Technologies New Channel Strategy in North America and Europe Mar. 17, 2010.
NetBrain Technologies Releases Enterprise Suite 4.0 at Ciscolive 2011, Jul. 8, 2011.
PCT International Search Report and Written Opinion dated Mar. 29, 2016, issued in corresponding International Application No. PCT/US2016/015603 (11 pages).
PCT International Search Report dated Aug. 7, 2014, issued in related International Application No. PCT/US2014/030647 (3 pages).
Schmidt et al., "Do-It-Yourself TMN Applications by Visual Programming Methods", IEEE Communications Magazine, IEEE Service Center, Piscataway, US, vol. 33, No. 11, Nov. 1, 1995, pp. 72-76.
Extended European Search Report dated Oct. 24, 2016, issued in corresponding European Application No. 16172682.3 (10 pages).
Extended European Search Report dated Mar. 28, 2019, issued in corresponding European Application No. 16172666.6 ( (8 pages).
U.S. Appl. No. 12/505,432, filed Jul. 17, 2009.
U.S. Appl. No. 12/505,461, filed Jul. 17, 20009.
U.S. Appl. No. 12/510,467, filed Jul. 28, 2009.
U.S. Appl. No. 15/287,230, filed Oct. 6, 2016.
U.S. Appl. No. 13/841,735, filed Mar. 15, 2013.
U.S. Appl. No. 13/842,024, filed Mar. 15, 2013.
U.S. Appl. No. 13/842,222, filed Mar. 15, 2013.
U.S. Appl. No. 14/619,957, filed Feb. 11, 2015.
U.S. Appl. No. 15/652,797, filed Jul. 18, 1017.
U.S. Appl. No. 16/374,374, filed Apr. 3, 2019.
U.S. Appl. No. 14/956,096, filed Dec. 1, 2015.
U.S. Appl. No. 16/375,297, filed Apr. 4, 2019.

\* cited by examiner

SYSTEM AND METHOD FOR NETWORK MANAGEMENT AUTOMATION

CROSS-REFERENCE TO RELATED APPLICATIONS

The present application claims the benefit of priority to U.S. Provisional Application Nos. 62/169,995, filed Jun. 2, 2015; 62/171,795, filed Jun. 5, 2015; and 62/171,802, filed Jun. 5, 2015. The entire contents of each of these applications are incorporated herein by reference.

TECHNICAL FIELD

This disclosure relates generally to network management. More specifically, it relates to system and method for creating and executing network applications that can automate network tasks using graphical user interface.

BACKGROUND

In a traditional network management method, a network professional usually runs a set of standard commands and processes manually for each network device. The commands and parameters associated therewith, however, are difficult to remember and cumbersome to use. In addition, repeated data retrieval has to be conducted for each individual network device in the network. For a large network containing many devices, pinpointing a network issue to a small number of devices is difficult to accomplish.

Moreover, data retrieved from different network devices may be stored in different formats and may lack consistency for efficient processing. Therefore, it is often difficult to combine, compare, and/or analyze data from these devices. As a result, some network management tasks, such as neighbor check, path analysis, are difficult to accomplish in an efficient manner.

The present disclosure is directed to overcoming or mitigating one or more of these problems as set forth above.

SUMMARY

One aspect of the present disclosure involves a method, implemented by a processor device, for providing visual network programming for network management automation. The method may include providing a graphical user interface (GUI) for automating network management tasks associated with a computer network. The method may also include receiving, through the GUI, a plurality of graphical icons. Each graphical icon may be associated with one or more operations or functions. The method may also include associating the plurality of graphical icons with a device table for defining a device queue by storing information of at least one network device in the computer network and a device data table for storing information to be retrieved from the at least one network device defined in the device queue. In addition, the method may include generating a network application based on the plurality of graphical icons and associated device table and device data table. The network application may include instructions for retrieving information from the at least one network device defined in the device queue and storing the retrieved information in the device data table.

Another aspect of the present disclosure involves a system for providing visual network programming for network management automation. The system may include a memory device storing computer codes for automating network management tasks associated with a computer network. The system may also include a processor device operatively coupled to the memory device. The computer codes stored on the memory device, when executed by the processor device, may cause the processor device to perform various operations. The operations may include providing a GUI and receiving, through the GUI, a plurality of graphical icons. Each graphical icon may be associated with one or more operations or functions. The operations may also include associating the plurality of graphical icons with a device table for defining a device queue by storing information of at least one network device in the computer network and a device data table for storing information to be retrieved from the at least one network device defined in the device queue. In addition, the operations may include generating a network application based on the plurality of graphical icons and associated device table and device data table. The network application may include instructions for retrieving information from the at least one network device defined in the device queue and storing the retrieved information in the device data table.

A further aspect of the present disclosure involves a method, implemented by a processor device, for automating network management tasks associated with a computer network. The method may include reading a device table to retrieve a device queue. The device queue may include at least one network device of the computer network. The method may also include retrieving information from the at least one network device by executing a network command customized for the at least one network device. The method may also include storing the retrieved information in a device data table corresponding to the at least one network device. In addition, the method may include processing data stored in the device data table based on a predetermined data analysis operation.

A further aspect of the present disclosure involves a system for providing network management automation. The system ay include a memory device storing computer codes for automating network management tasks associated with a computer network. The system may also include a processor device operatively coupled to the memory device. The computer codes stored on the memory device, when executed by the processor device, may cause the processor device to perform various operations. The operations may include reading a device table to retrieve a device queue, the device queue including at least one network device of the computer network. The operations may also include retrieving information from the at least one network device by executing a network command customized for the at least one network device. The operations may also include storing the retrieved information in a device data table corresponding to the at least one network device. In addition, the operations may include processing data stored in the device data table based on a predetermined data analysis operation.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments of the invention, examples of which are illustrated in the accompanying drawings. When appropriate, the same reference numbers are used throughout the drawings to refer to the same or like parts.

Embodiments consistent with the present disclosure involve system and method for automating network management tasks. Exemplary network management tasks may include network neighbor check (e.g., interface speed/duplex matching), data traffic path analysis (e.g., quality of service check along the path), inventory report, network performance monitoring, network troubleshooting, network mapping, or other tasks. Automating a network management task may refer to a process in which one or more steps of the network management task are automatically conducted by at least one processor device, such as a CPU of a network management station. A network management station may include a dedicated hardware computer device specifically designed for management of computer networks. Alternatively or additionally, a network management station may include a general purpose computer equipped with network management software. Automating network management tasks may be accomplished using one or more network management applications (also referred to as network applications), which may include software instructions (also referred to as instructions, software codes, or codes) to be executed by one or more processor devices (e.g., a CPU of a network management station) to automatically perform one or more steps of a network management task. For convenience of description, a network application is also referred to herein as a Qapp, although such an application can have other names.

Figure 1:
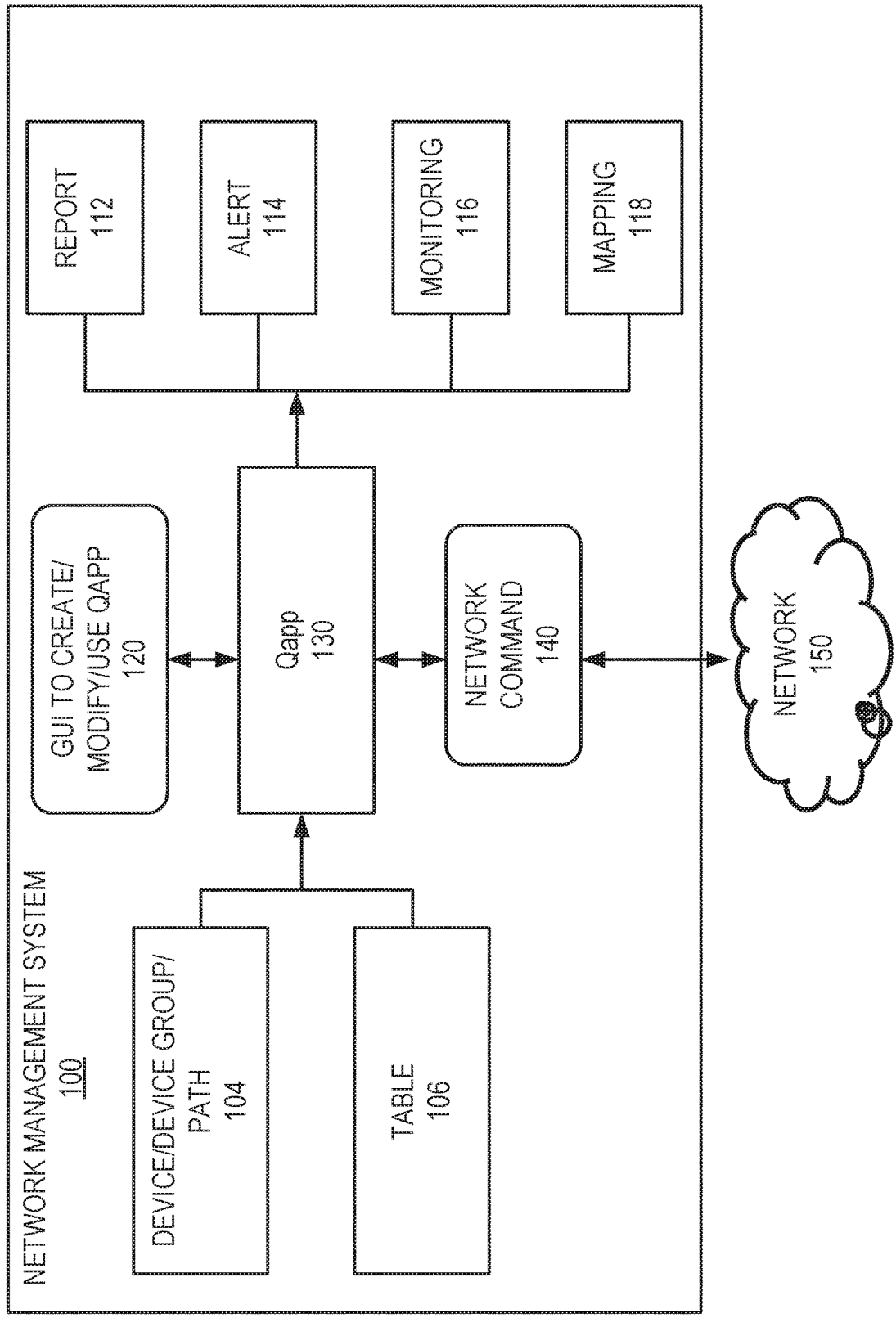
FIG. 1 is a block diagram of an exemplary network management system, according to some embodiments of the present disclosure.

FIG. 1 is a block diagram of an exemplary network management system 100, consistent with some embodiments disclosed in the present application. System 100 may be implemented by one or more network management stations, as described above. System 100 may provide a GUI 120 to interact with a user of the system. For example, system 100 may include a display device (not shown in FIG. 1) to display GUI 120. System 100 may also include one or more input devices (not shown in FIG. 1), such as a keyboard, a mouse device, a scanner, a camera, a mic, etc. to receive information from the user. The user of system 100 may create, modify, and/or execute one or more Qapps, such as Qapp 130, through GUI 120. Qapp 130 may be created by defining an execution flow including a set of ordered graphic icons (also referred to as visual blocks or graphic indicators) to facilitate efficient network programing. After Qapp 130 is created and saved, it can be compiled into executable software codes to perform various network management tasks. System 100 may include one or more processor devices (not shown in FIG. 1), one or more memory devices (not shown in FIG. 1), and other computer devices to execute Qapp 130.

Qapp 130 may receive various input information. For example, Qapp 130 may receive device related information 104, such as information of a single device, a device group, or a network data traffic path (also referred to as traffic path, application path, or path) consisting of a plurality of devices. As used herein, a device refers to a network device that is part of a computer network, such as a switch, a router, a hub, a bridge, a brouter, a gateway, etc. Device related information 104 may be preset and loaded into Qapp 130, input by a user, automatically generated through a discovery process, dynamically determined based on a network map on which Qapp 130 is running, or through other suitable means. Qapp 130 may also receive table data 106, including any data in a tabular format. For example, table data 106 may be in the form of a CSV file, a TXT file, an XLS file, or other types of digital files having a tabular format. Table data 106 may be preset and loaded into Qapp 130, imported from a digital file into Qapp 130, input by a user, generated by another Qapp, or through other suitable means. Device related information 104 and/or table data 106 may also be modified during runtime of Qapp 130.

Qapp 130 may interact with a network 150 to retrieve information using various network commands 140. For example, network 150 may include a plurality of network devices, which may be at different network levels (e.g., Level 2, Level 3, etc.), made by different vendors (e.g., Cisco, Juniper, etc.), and operate under different software. Qapp 130 may retrieve information from the network devices using network commands customized to these network devices. Different sets of commands may be executed for different types of network devices. The commands may include CLI commands, SNMP commands, or API calls. In this way, Qapp 130 may act as a universal network management tool applicable to any network regardless of the underlying structure and composition of the network. The retrieved information may be analyzed and processed by one or more operation logics of Qapp 130 to generate desirable output information.

The output information of Qapp 130 may be in various forms and be used in many ways. For example, FIG. 1 shows some exemplary outputs, such as report 112, alert 114, monitoring information 116, and mapping data 118. Report 112 may include a data file, a display, or a printout of a report containing data in a particular format. Alert 114 may include a message, a visual indicator (e.g., a pop up, an icon, an animation, etc.), a change of display (e.g., a highlight, a blink, a change of color, etc.), or other forms of alerts. Monitoring information 116 may include a periodically updated network parameter or other data for monitoring the performance or status of the network or network components (network devices, interfaces, links, etc.). Mapping data 118 may include topological information, e.g., connection information and network design data such as routing protocol(s) and interface(s) configured for the device.

Figure 2:
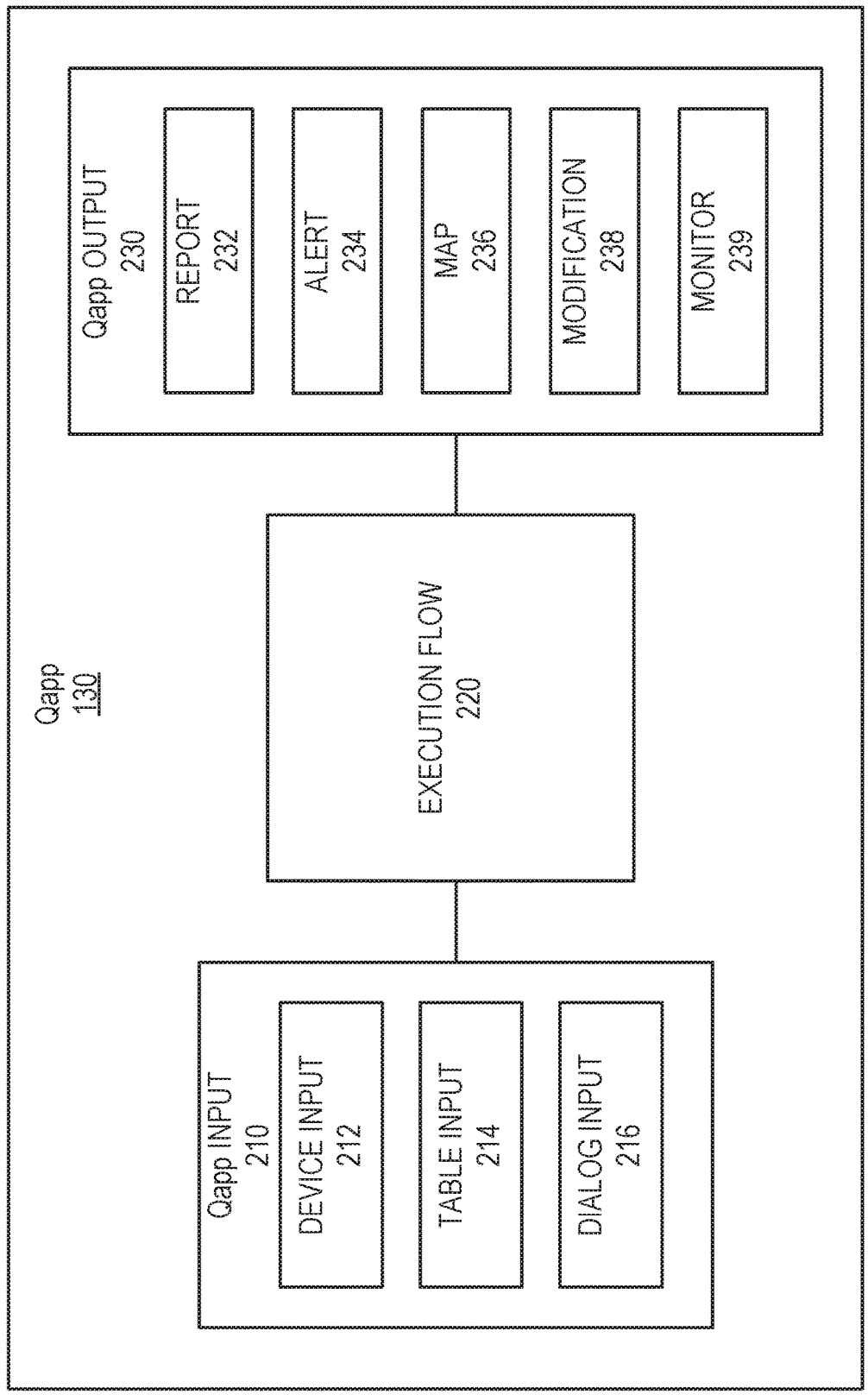
FIG. 2 shows an exemplary functional structure of a Qapp, according to some embodiments of the present disclosure.

Qapp 130 may include one or more functional components. For example, FIG. 2 shows an exemplary functional structure of Qapp 130. As shown in FIG. 2, Qapp 130 may include a Qapp input 210, an execution flow 220, and a Qapp output 230. Qapp input 210 may include a device input portion 212 for receiving device related information 104 such as device, device group, or path. Input 210 may also include a table input portion 214 for receiving table data 106. Input 210 may also include a dialog input portion 216 to receive user input information from one or more dialogs or other user interaction means. Qapp output 230 may include a report portion 232 for outputting reports (e.g., CSV files, XLS files, etc.), an alert portion 234 for outputting alerts (e.g., messages, visual indicators, changes of display, etc.), a map portion 236 for outputting mapping information, a modification portion 238 for outputting modification information such as device property modification, topology modification, etc., and a monitor portion 239 for outputting monitoring data.

Qapp 130 may include an execution flow 220. Execution flow 220 may include a series of operations to process input data and generate output data. Execution flow 220 may include control blocks such as If and Loop blocks, dialogs, and canvases. The term canvas, as used herein, refers to an execution unit capable of performing a set of operations to its input to generate an output. In other words, each canvas may perform a specific function or a set of functions.

Figure 3:
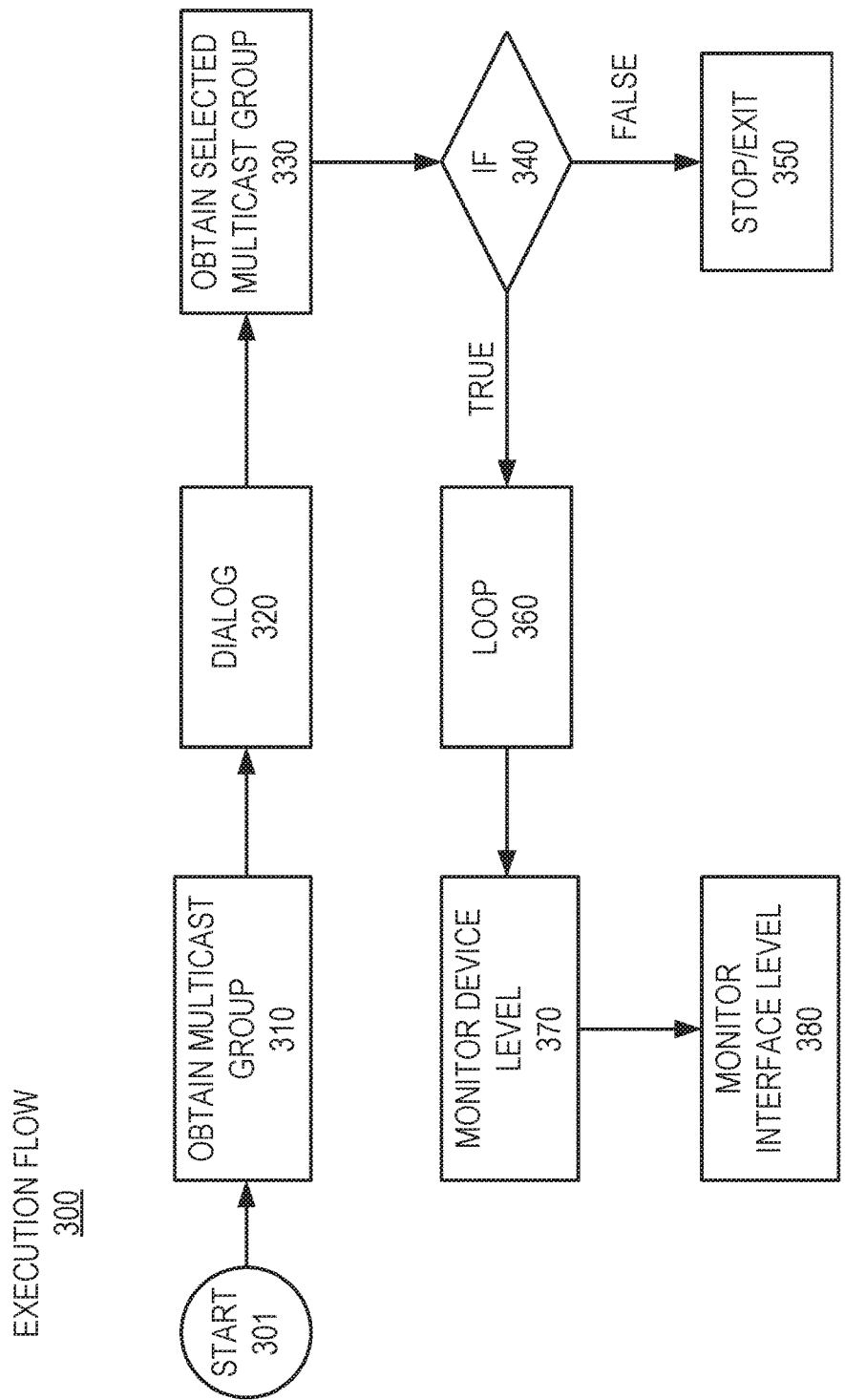
FIG. 3 shows an exemplary canvas flow, according to some embodiments of the present disclosure.

FIG. 3 shows an exemplary Qapp execution flow 300 including a plurality of canvases and other types of nodes. Execution flow 300 may be used to obtain one or more multicast groups from network devices and monitor the status of a certain multicast group. Execution flow 300 includes a flow of operations starting from a start node 301. The flow continues to the first canvas node 310. Canvas node 310 may be used to obtain all multicast groups configured in the network devices. The flow then enters into a dialog node 320, in which the obtained multicast groups can be listed to allow a user to select a group. The selection information can then be passed on to a canvas node 330. Based on the selection information, canvas node 330 can retrieve information of the selected group. The flow then continues to a condition node 340 (also referred to as a "IF" node). Condition node 340 may evaluate the input information from canvas node 330. For example, condition node 340 may evaluate whether the multicast group selected by the user (e.g., selected by the user at dialog node 320) is valid. The flow is then forked into two branches. If the condition is not satisfied (e.g., the multicast group selected by the user is not valid), the flow proceeds to a stop node 350, exiting execution flow 300. Otherwise the flow proceeds to a loop node 360 followed by two canvas nodes 370 and 380. Canvas node 370 may be used to monitor device level data and canvas node 380 may be used to monitor interface level data. Loop node 360 may include a frequency parameter, such as every 2 minutes, indicating the looping frequency. All nodes following loop node 360 may be executed repeatedly according to this frequency parameter. For example, canvas nodes 370 and 380 may be executed every 2 minutes during execution of flow 300.

As described above, a canvas is an execution unit to perform a specific function or a set of functions. For example, a common type of canvas may be used to retrieve data from one or more network devices and perform data analysis. A canvas may achieve its functionality using a flow of operations similar to execution flow 300. As used herein, the term execution flow may refer to any flow of execution or operation that processes input data and generate output data. In the context of a Qapp, an execution flow may include a series of canvases and other types of nodes. In the context of a canvas, an execution flow may include a series of functional blocks, usually represented as a flow of graphical icons, that collectively perform the specific function or set of functions associated with the canvas.

Figure 4:
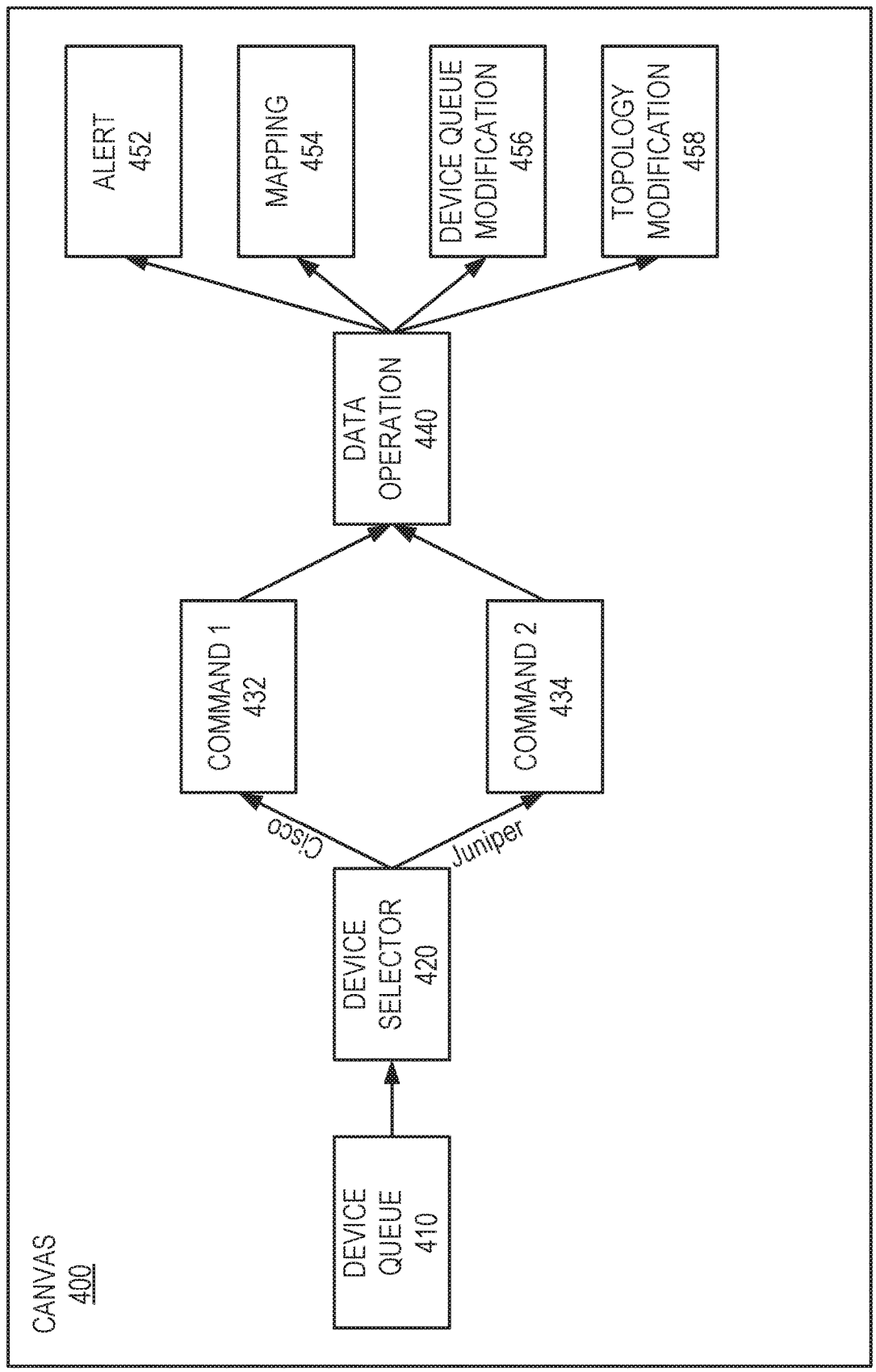
FIG. 4 shows an exemplary canvas, according to some embodiments of the present disclosure.

FIG. 4 shows an exemplary canvas 400. Canvas 400 includes a flow containing a set of ordered graph icons. Each type of graph icon of this flow may be associated with a certain type of functions, operations, or data input/output. For example, a device queue 410 may indicate one or more devices from which data acquisition may be conducted. In some embodiments, the device(s) in device queue 410 may be organized in a tabular format. For example, a device column may be used to list all device(s) (e.g., identifier(s) of the device(s)) in the device queue. Additional columns may be added to list other information relating to the device(s), such as interface(s), IP address(es), data rate(s), etc. Each row may include information of only one device, while a single device may occupy multiple rows to accommodate related information. For example, a device may include multiple interfaces and each interface may have its own data rate. Therefore, each interface of the device may occupy a separate row. The column/row arrangement described above is for exemplary purposes only. Other data organization methods may also be used to store device related information.

Device queue 410 may be used to control a looping operation of canvas 400. For example, each row in device queue 410 may be used as an input to initiate a series of operations defined by other components of canvas 400. After the operations based on one row finishes, the next row may be used to initiate another round of operations until all rows in device queue 410 are traversed.

In some embodiments, device queue 410 may be obtained by receiving information provided by a user. For example, the user may input device queue information through GUI 120. In some embodiments, device queue 410 may be obtained by importing information from a digital file. For example, device queue information may be stored in a CSV file and may be imported, e.g., through GUI 120, into canvas 400. Device queue 410 can be dynamically modified. For example, a canvas can be created to discover a network. An initial device queue may contain information of a seed network device, such as its IP address or other types of identifier. System 100 may then perform an auto discovery process to automatically discover neighboring network devices of the seed network device. The neighboring network devices may be physically or logically connected to the seed network device. For example, the neighboring network devices may be Level 3 neighbors of the seed device. In another example, the neighboring network devices may be Level 2 neighbors of the seed device. The auto discovery process may discover the first level neighbors of the seed device, where the discovered neighbors are immediately connected to (logically or physically) the seed device. The auto discovery process may further discover additional levels of the neighbors, e.g., the neighbors of the first level neighbors. In this way, any portion or the entirety of the network connected to the seed device may be discovered. The collection of the discovered network devices, or any subset thereof, may be used as information of device queue 410.

Device queue 410 may contain topological information associated with the devices in the device queue. For example, as shown in Table 2 above, device queue 410 may include two columns, containing information of a device and its neighbors. In some embodiments, one device in the device queue may be identified as "this" device. "This" device's neighbor may be identified as "neighbor" or "nbr" device. Connected interfaces or other types of information can also be included in device queue 410 as additional columns. In some embodiments, devices in device queue 410 may form a network traffic path. In this case, once a device is identified as "this" device, the device immediately prior to "this" device in the path may be identified as "previous" or "prev" device, while the device immediately following "this" device in the path may be identified as "next" device. While these exemplary topological identifiers are intuitive, other identifiers may also be used to indicate the connection information between a pair of devices. In some embodiments, when a Qapp is executed, neighboring devices or devices along an application path can be automatically discovered and information of the discovered devices can be automatically ported into device queue 410.

Referring to FIG. 4, canvas 400 may include a device selector 420. Device selector 420 may follow device queue 410 in the execution flow defined in canvas 400. Device selector 420 may be used to provide a customized network command to the device currently in the execution flow based on the type of the device, such that the command is executable by the device and suitable for retrieving information from the device. The type of the device may include the vendor information of the device. As used herein, a vendor may refer to a manufacturer or technology provider of the device. For example, devices in device queue may be made by or built according to the technology of Cisco, Juniper, etc. Devices from different vendors may generally be considered as of different types. In some cases, devices from the same manufacturer or technology provider may still be considered as of different types when, for example, the devices are made according to different technology generations, the devices are of different models, or the devices operate under different kinds, versions, or update levels of software. Device selector 420 may differentiate devices of different types based on, for example, reading device property information such as hostname, device type, vendor model, etc. and comparing the information against a database. Based on the device type information, device selector 420 may divert the execution flow to one of the command blocks 432, 434, to provide a customized network command executable by the device. For example, the customized network command may be a Command-Line Interface (CLI) command. As different vendors may implement different CLI command set specific for the vendor's own devices, a CLI command executable by vendor A's devices may not be executable by vendor B's devices. Device selector 420 may bridge the gap created by the non-uniform CLI command sets and provide branched command options customized for a specific type of device listed in the device queue. Execution flow of canvas 400 may proceed to the appropriate branch based on the device type determination made by device selector 420. As an example, FIG. 4 shows that when the device is a Cisco device, device selector 420 branches the flow to command block 432, which provides a Cisco CLI command for retrieving information from the device. When the device is a Juniper device, device selector 420 branches the flow to command block 434, which provides a Juniper CLI command for retrieving information from the device.

Once the proper command is selected, data acquisition may be performed using the command to retrieve information from the device. In some embodiments, information may be retrieved using a sample-driven approach, in which the execution result of the command is analyzed and parsed based on customizable or user definable variables. The retrieved information may be processed by data operation block 440.

Data operation block 440 may include operation logics for data manipulation. For example, as the execution flow defined by canvas 400 loops for each row of device queue 410, operation result of each individual row (e.g., information retrieved from the underlying device or interface corresponding to the row) may be saved individually after each loop. Each individual operation result may be processed and/or analyzed. After all rows are traversed, operation results individually saved, processed, or analyzed may be combined, compared, or further processed or analyzed together.

Data processed by data operation block 440 may be output in various forms. For example, the data may be used by alert block 452 to trigger an alert, by mapping block 454 to generate a map or map components, by device queue modification block 456 to modify device queue 410, or by topology modification block 458 to modify the topological information. The data may also be used as an input to another canvas, or be exported as digital files or reports.

Canvas 400 may also define operation data associated with the functional blocks that define the execution flow. The operation data may include one or more data tables that store information relating to the devices, information retrieved from the devices, or information derived from the above two kinds of data. For example, device queue 410 may be in the form of a table, with the list of devices, interfaces, and/or links organized in a row or column of the table. Table 1 shows an exemplary device queue that includes a single device R1 (e.g., "this" device) and its interfaces (s0/0, s0/1, e0/0, and e0/1). Table 2 shows another exemplary device queue that includes neighboring device pairs. For example, the header of Table 2 indicates "this" device, the interface of "this" device, "neighbor" device, and the interface of the "neighbor" device. The first row of Table 2 indicates that device R1 are R2 are neighboring devices and they are connected to each other through their corresponding interfaces s0/0 (R1's interface) and s0/0 (R2's interface). The other rows of Table 2 indicate similar information. The neighboring devices may be L1, L2, or L3 neighbors. In some embodiments, a device pair may not be neighbors and the pair may be referred to as "this" device and "other" device. Table 3 shows an exemplary device queue that includes a device group. The device group may include a plurality of devices (R1, R2, R3, . . . ) and their interfaces (s0/0, s0/1, e0/0, etc.). Table 4 shows another exemplary device queue that includes only the devices without their interfaces.

TABLE 1

| this | this_intf |
|------|-----------|
| R1   | s0/0      |
| R1   | s0/1      |
| R1   | e0/0      |
| R1   | e0/1      |

TABLE 2

| this | this_intf | nbr | nbr_intf |
|---|---|---|---|
| R1 | s0/0 | R2 | s0/0 |
| R1 | e0/0 | R3 | e0/0 |
| R1 | s0/1 | R4 | s0/0 |

TABLE 3

| this | this_intf |
|---|---|
| R1 | s0/0 |
| R1 | s0/1 |
| R1 | e0/0 |
| R1 | e0/1 |
| R2 | s0/0 |
| R2 | s0/1 |
| R2 | e0/0 |
| R3 | s0/0 |
| ... | |

TABLE 4

| this | this_intf |
|---|---|
| R1 | |
| R2 | |
| R3 | |
| R4 | |

Information retrieved from a device by executing a command and parsing the execution result may also be stored in a table. In some embodiment, the table storing data corresponding to a network device may be referred to as a device data table. A device data table may stored data retrieved from a device in one execution cycle and may be updated with new data in another execution cycle. A global data table, on the other hand, may store information retrieved from multiple devices and may share such information between different canvases. Exemplary table data operations will be described below in connection with FIGS. 5 and 6.

Figure 5:
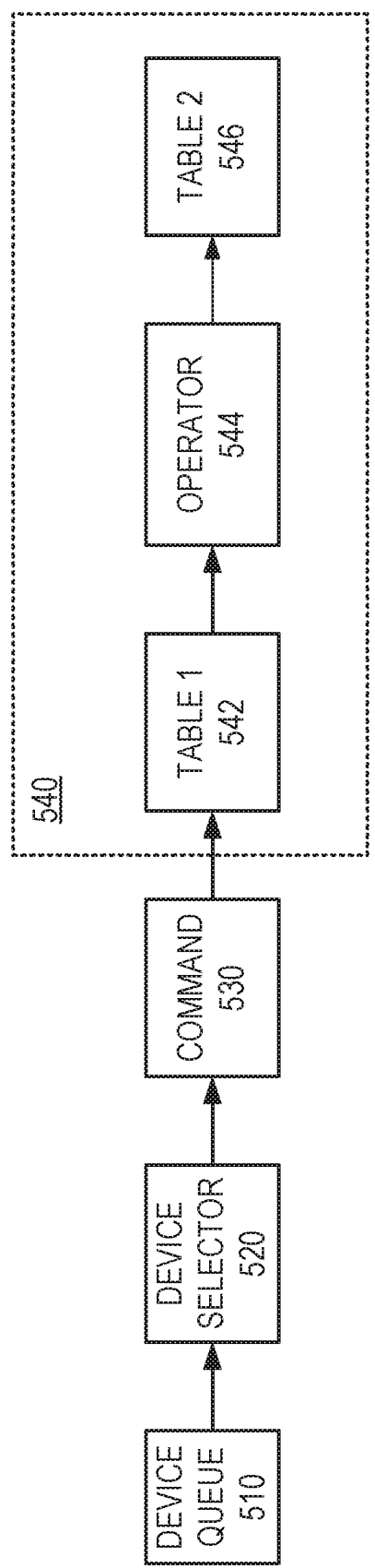
FIG. 5 shows an exemplary table data operation, according to some embodiments of the present disclosure.

FIG. 5 shows an exemplary canvas 500 that include one-table-input operations. Similar to FIG. 4, canvas 500 includes a device queue 510, a device selector 520, and a command 530. The output of command 530 may be stored in a device data table 542. Table 542 may form an input to operator 544, which in turn generates an output table 546. Tables 542, 546, and operator 544 together may constitute data operation logic 540, which may be part of the execution flow of canvas 500. Because operator 544 receives a single table 542 as input, operator 544 may be referred to as a one-table-input operator.

In some embodiments, table 546 may be a sub table, which is a new table including a subset of data contained in input table 542. For example, operator 544 may remove one or more rows from table 542 based on certain conditions. In another example, operator 544 may keep one or more rows based on certain conditions. The conditions may be defined based on the value of the data entries, device properties, variables defined in a parser, logical operators, functions of variables or values, or a script defining the relationship among various parameters. The sub table operation may filter the raw data retrieved from a device and leave only data of particular interests or data satisfying certain conditions. Sub table 546 may be further processed or be output as a digital file, an alert, a map highlight, or other types of output. For example, Table 5 shows an exemplary table 542 that serves as an input to operator 544. Table 5 includes four interfaces and their speed, duplex, and mtu values. The condition of sub-tabling may be defined as removing rows that contain mtu not equal to 1500. After the sub-tabling operation, Table 6 may be generated (e.g., an exemplary table 546) that excludes the row associated with the e0/1 interface.

TABLE 5

| interface | speed | duplex | mtu |
|---|---|---|---|
| e0/0 | 100 | full | 1500 |
| e0/1 | 100 | half | 1472 |
| f0/1 | 1000 | auto | 1500 |
| s0/0 | 100 | full | 1500 |

TABLE 6

| interface | speed | duplex | mtu |
|---|---|---|---|
| e0/0 | 100 | full | 1500 |
| f0/1 | 1000 | auto | 1500 |
| s0/0 | 100 | full | 1500 |

In some embodiments, operator 544 may convert a device data table into a global data table. As described above, a device data table may only store data corresponding to a single device, while a global data table may store data of multiple devices. By converting a device data table to a global data table, a device row or column may be added to the device data table. The converting operation may support appending data to the converted global data table, where each input device data table may be appended into the global data table such that existing data in the global data table are preserved. The converting operation may also support overwriting data of the global data table, where new input data may overwrite existing data in the global data table. Because global data table may be shared among different canvases, converting a device data table into a global data table may facilitate data sharing among different canvases in a Qapp.

In some embodiments, operator 544 may compute a delta value. A delta value may refer to a difference between two data entries obtained at different times. Therefore, a delta value may be computed when canvas 500 is configured to loop by time. For example, operation sequence 510→520→530→542 may be recursively executed to retrieve information from the device corresponding to table 542. Information retrieved from the device may be stored in table 542 every time the operation sequence is executed. Operator 544 may the compute a different between information retrieved at different time points. For example, table 546 may be expanded to include three new columns: a column storing the value of a data entry obtained during last execution; a column storing the value of the data entry obtained during current execution; and a column storing the difference between these two values. Table 7 shows an exemplary delta table that includes the current error values, last error values, and delta error values of three interfaces. The delta values may capture the temporal change of a network parameter and may be used to monitor the operation status of a live network.

TABLE 7

| interface | error.now | error.last | error.delta |
|---|---|---|---|
| e0/0 | 1500 | 1472 | 28 |
| e0/1 | 1472 | 1472 | 0 |
| e0/2 | 1500 | 1500 | 0 |

Figure 6:
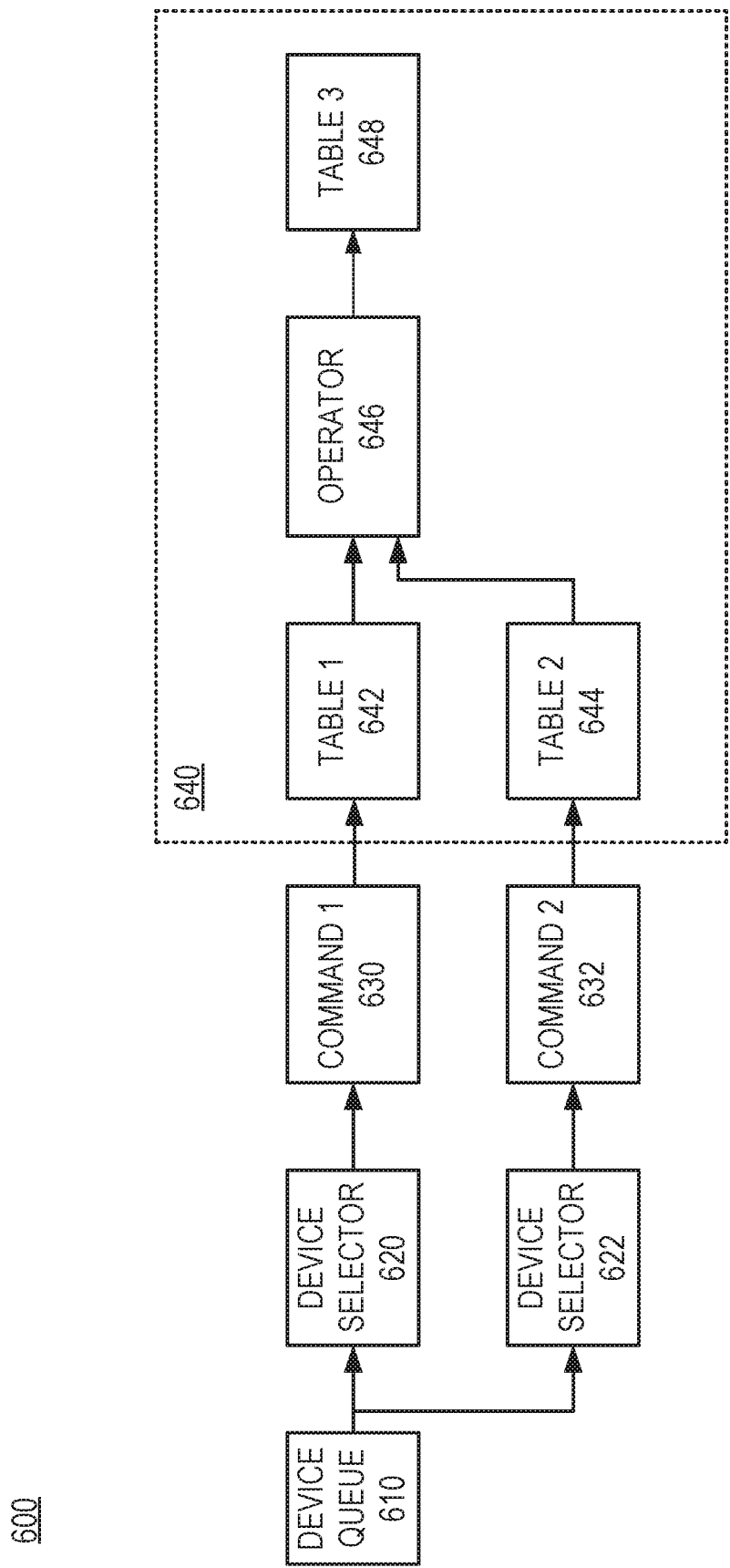
FIG. 6 shows another exemplary table data operation, according to some embodiments of the present disclosure.

FIG. 6 shows an exemplary canvas 600 that include two-table-input operations. Similar to FIG. 4, canvas 600 includes a device queue 610, device selectors 620, 622, and commands 630, 632. The output of command 630 may be stored in a device data table 642. Similarly, the output of command 632 may be stored in a device data table 644. Tables 642 and 644 may form the input to operator 646, which in turn generates an output table 648. Tables 642, 644, 648, and operator 646 together may constitute data operation logic 640, which may be part of the execution flow of canvas 600. Because operator 646 receives two tables 642 and 644 as input, operator 646 may be referred to as a two-table-input operator.

In some embodiments, operator 646 may be used to perform neighbor join function to join two device data tables retrieved from two neighboring devices. The topological information, such as the neighboring connection information of two devices, may be contained in device queue 610. For example, device queue 610 may define a "this" device and a "neighbor" device. In addition, device queue 610 may define interfaces of each device and the corresponding interfaces that connection the two neighboring devices. Based on the topological information, operator 646 may identify the matching interfaces between "this" and "neighbor" devices, and join the corresponding data entries in tables 642 and 644 together to store in table 648. For example, table 648 may include a column of "this device", a column of "this interface" (indicating the interface of this device used to connect to "neighbor device"), a column of "neighbor device", and a column of "neighbor interface" (indicating the interface of neighbor device used to connect to "this device"). Operator 646 may automatically add information of matching device/interface into the same row such that network parameters retrieved for the matching device/interface may be stored together. In applications such as speed/duplex test, the joint table may be used to determine match/mismatch by comparing corresponding values in the same row. Table 8 shows an exemplary table that includes intermediate data during a neighbor join operation. In Table 8, it is assumed that the device queue is defined by Table 2, in which R1 and R2 are neighboring devices and connected to each other through R1's interface s0/0 and R2's interface s0/0. Similarly, R1 and R3 are neighboring devices and connected to each other through R1's interface e0/0 and R3's interface e0/0. During each data acquisition process, mtu values of R1's interfaces may be retrieved from R1 (e.g., by executing command 630 and parsing the execution result) and stored in table 642. Similarly, mtu values of R2's interfaces may be retrieved from R2 and stored in table 644. These two tables may be joined together, as shown in Table 8. Referred to Table 8, the device/interface/mtu columns of R1 and those columns of R2 may be arranged side by side in Table 8. The mtu values of all R1's interfaces may then be listed on the left side. Because R1 and R2 are connected to each other through R1's s0/0 and R2's s0/0 (e.g., referring to Table 2), the mtu value of R2's interface s0/0 may then be placed in the same row as the mtu value of R1's interface s0/0, while the mtu values of R2's other interfaces may be placed next to all row of R1's mtu values. Similarly, when the mtu values of R3's interfaces are obtained, they can be arranged in a similar manner. As a result, only the mtu values of the matching interfaces (e.g., interfaces through which two neighboring devices are connected to each other) are placed in the same row. Table 8 may then be appended in this way until all devices and interfaces are traversed in the device queue. Then, mtu values of the matching interfaces may be collected together to form a new form such as Table 9, in which only the rows including matching interfaces are kept.

TABLE 8

| device | interface | mtu | device | interface | mtu |
|---|---|---|---|---|---|
| R1 | s0/0 | 1500 | R2 | s0/0 | 1472 |
| R1 | e0/0 | 1472 | | | |
| R1 | s0/1 | 1500 | | | |
| | | | R2 | e0/0 | 1500 |
| | | | R2 | e0/1 | 1472 |
| | | | R3 | e0/0 | 1500 |
| R1 | e0/0 | 1472 | | | |
| R1 | s0/0 | 1500 | | | |
| R1 | s0/1 | 1500 | | | |
| | | | R3 | e0/1 | 1472 |

TABLE 9

| this | this_interface | mtu | nbr | nbr_interface | mtu |
|---|---|---|---|---|---|
| R1 | s0/0 | 1500 | R2 | s0/0 | 1472 |
| R1 | e0/0 | 1472 | R3 | e0/0 | 1500 |

In some embodiments, operator 646 may merge tables 642 and 644. For example, the merged table 648 may include one or more rows from each of tables 642 and 644. In another example, tables 642 and 644 may be updated each time when a new loop of operation is executed, and the updated data may be appended to table 648. The merging operation provides a flexible way to combine data from two or more tables for generate reports or performing further analysis.

Figure 7:
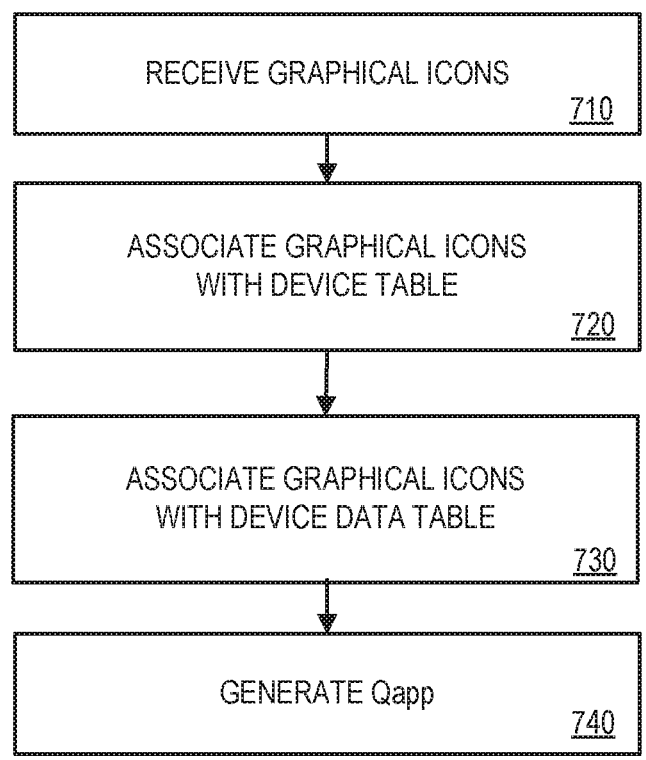
FIG. 7 is a flow chart of an exemplary method of creating a Qapp, according to some embodiments of the present disclosure.

FIG. 7 is a flow chart of an exemplary method 700 for creating a Qapp. Method 700 includes a plurality of steps, some of which may be optional. In step 710, system 100 may receive a plurality of graphical icons. System 100 may also receive information for interconnecting the plurality of graphical icons. Each graphical icon may be associated with one or more operations or functions. For example, a graphical icon may define one or more actions to be executed on at least one network device in the computer network. In another example, a graphical icon may define one or more operations to be performed on data relating to the computer network. Exemplary graphical icons include device queue 410/510/610, device selector 420/522/524/622/624, tables 542/546/642/644/648, operators 544/646, and other functional blocks. A user may drag/drop individual graphical icons, set parameters, make connections, and execute the resulting Qapp using GUI 120. System 100 may receive one or more graphical icons (e.g., device queue, device selector, table, operator, etc.) deployed by the user through GUI 120. In step 720, system 100 may associate the graphical icons with a device table. The device table may define a device queue by storing information of at least one network device in the computer network. In some embodiments, the device queue may contain information for interconnecting the plurality of graphical icons (e.g., this/neighbor etc.). In step 730, system 100 may associate the plurality of graphical icons with at least one device data table for storing information to be retrieved from the at least one network device defined in the device queue. For example, system 100 may associate the device table, device data table, etc. to the graphical icons 510/610, 542/642/644, etc. In step 740, system 100 may generate a Qapp based on the plurality of graphical icons (e.g., the graphical icons may can define an execution flow) and associated device table and device data table. The generated Qapp may include executable codes for retrieving information from the network device(s) defined in the device queue and storing the retrieved information in the device data table(s).

Figure 8:
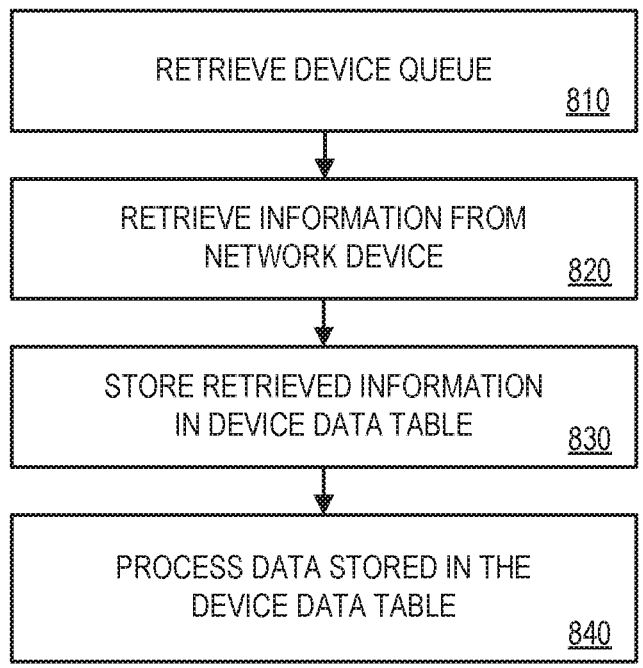
FIG. 8 is a flow chart of an exemplary method of executing a Qapp, according to some embodiments of the present disclosure.

FIG. 8 is a flow chart of an exemplary method 800 for executing a Qapp. In step 810, the executing Qapp may cause system 100 to retrieve a device queue defined by the Qapp. For example, device information in the device queue may be retrieved by system 100 by sequentially traversing each device in the device queue. In step 820, system 100 may execute a network command customized for at least one network device (e.g., command from an appropriate command block) to retrieve information from that device. In step 830, system 100 may store the retrieved information in a device data table corresponding to the network device. For example, information retrieved from the device(s) defined in device queue 510 may be stored in device data table 542. In step 840, system 100 may process data stored in the device data table based on a predetermined data analysis operation. For example, system 100 may perform one-table-input operations such as sub-tabling, converting, delta computing, etc. (e.g., using operator 544) or two-table input operations such as neighbor joining, merging, etc. (e.g., using operator 646) to process data stored in the corresponding device data table.

The specification has described network management systems and methods. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store computer code instructions for execution by one or more processors, including computer code instructions for causing the processor(s) to perform steps or stages consistent with the embodiments described herein. The term "computer-readable medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method, implemented by a processor device, of automating network management tasks associated with a network comprising a plurality of network devices, the processor device coupled to a memory storing computer code executable by the processor device to implement the method, the method comprising:

reading, by the processor device, a device table and retrieving a device queue that indicates network devices of the network from which data is acquired, the device queue comprising first device queue information and second device queue information, each of which include topological information regarding when the network devices of the network are neighboring devices, the first device queue information comprising information on interfaces of a first network device corresponding with a first type and the second device queue information comprising information on interfaces of a second network device corresponding with a second type, wherein the first type corresponds with a vendor information for the first network device and the second type corresponds with a vendor information for the second network device;

determining, by the processor device, a first customized network command executable by the first network device based on the first type of the first network device, wherein the first customized network command corresponds with the vendor information for the first type;

sending, by the processor device, the first customized network command to the first network device;

receiving, by the processor device, first device information in response to execution of the first customized network command by the first network device, wherein the first device information is updated each time the first customized network command is executed by the first network device;

storing, by the processor device, in a first device data table, the first device information received from the first network device;

determining, by the processor device, a second customized network command executable by the second network device based on the second type of the second network device, wherein the second customized network command corresponds with the vendor information for the second type;

sending, by the processor device, the second customized network command to the second network device;

receiving, by the processor device, second device information in response to execution of the second customized network command by the second network device, wherein the second device information is updated each time the second customized network command is executed by the second network device;

storing, by the processor device, in a second device data table, the second device information received from the second network device;

identifying, by the processor device, from the topological information from the first device queue information and from the topological information from the second device queue information, matching interfaces that connect the first and second network devices; and joining, by the processor device, in a joined data table, information retrieved from the first device data table and from the second device data table corresponding to the matching interfaces.

2. The method of claim 1, further comprising at least one of:

generating a new table including a subset of data of a device data table based on one or more conditions;

converting a device data table into a global data table, wherein the global data table allows for storing information retrieved from multiple network devices; or merging two device data tables.

3. The method of claim 1, further comprising:

recursively retrieving information from at least one network device in the network;

storing information retrieved at a first time in at least one device data table corresponding to the at least one network device; and storing information retrieved at a second time in the at least one device data table corresponding to the at least one network device, the second time being different from the first time, wherein processing data stored in the at least one device data table comprises computing a difference between information retrieved at the first time and the second time.

4. The method of claim 1, wherein the first type of the first network device comprises vendor information of the first network device.

5. The method of claim 1, wherein the first type of the first network device comprises technology generation information of the first network device.

6. The method of claim 1, wherein the first type of the first network device comprises model information of the first network device.

7. The method of claim 1, wherein the first customized network command is a Command-Line Interface (CLI) command.

8. The method of claim 1, wherein the first customized network command is a Cisco CLI command and the second customized network command is a Juniper CLI command.

9. A system for automating network management tasks associated with a network comprising a plurality of network devices, the system comprising:

a processor device; and a memory device operatively coupled to the processor device storing computer code that, when executed by the processor device, causes the processor device to perform a method comprising:

reading a device table and retrieving a device queue that indicates network devices of the network from which data is acquired, the device queue comprising first device queue information and second device queue information, each of which include topological information regarding when network devices of the network are neighboring devices, the first device queue information comprising information on interfaces of a first network device corresponding with a first type and the second device queue information comprising information on interfaces of a second network device corresponding with a second type, wherein the first type corresponds with a vendor information for the first network device and the second type corresponds with a vendor information for the second network device;

determining a first customized network command executable by the first network device based on the first type of the first network device, wherein the first customized network command corresponds with the vendor information for the first type;

sending the first customized network command to the first network device;

receiving, by the processor device, first device information in response to execution of the first customized network command by the first network device, wherein the first device information is updated each time the first customized network command is executed by the first network device;

storing, in a first device data table, the first device information received from the first network device;

determining a second customized network command executable by the second network device based on the second type of the second network device, wherein the second customized network command corresponds with the vendor information for the second type;

sending the second customized network command to the second network device;

receiving, by the processor device, second device information in response to execution of the second customized network command by the second network device, wherein the second device information is updated each time the second customized network command is executed by the second network device;

storing, in a second device data table, the second device information received from the second network device;

identifying, from the topological information from the first device queue information and from the topological information from the second device queue information, matching interfaces that connect the first and second network devices; and joining, in a joined data table, information retrieved from the first device data table and from the second device data tables corresponding to the matching interfaces.

10. The system of claim 9, wherein the method further comprises at least one of:

generating a new table including a subset of data of a device data table based on one or more conditions;

converting a device data table into a global data table, wherein the global data table allows for storing information retrieved from multiple network devices; or merging two device data tables.

11. The system of claim 9, wherein the method further comprises:

recursively retrieving information from at least one network device in the network;

storing information retrieved at a first time in at least one device data table corresponding to the at least one network device; and storing information retrieved at a second time in the at least one device data table corresponding to the at least one network device, the second time being different from the first time, wherein processing data stored in the at least one device data table comprises computing a difference between information retrieved at the first time and the second time.

12. The system of claim 9, wherein the first type of the first network device comprises vendor information of the first network device.

13. The system of claim 9, wherein the first type of the first network device comprises technology generation information of the first network device.

14. The system of claim 9, wherein the first type of the first network device comprises model information of the first network device.

15. The system of claim 9, wherein the first customized network command is a Command-Line Interface (CLI) command.

16. The system of claim 9, wherein the first customized network command is a Cisco CLI command and the second customized network command is a Juniper CLI command.

* * * * *